(12) United States Patent
Baba

(10) Patent No.: US 9,945,927 B2
(45) Date of Patent: Apr. 17, 2018

(54) OBJECT DETECTION APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/513,522

(22) PCT Filed: Sep. 10, 2015

(86) PCT No.: PCT/JP2015/075746
§ 371 (c)(1),
(2) Date: Mar. 22, 2017

(87) PCT Pub. No.: WO2016/047457
PCT Pub. Date: Mar. 31, 2016

(65) Prior Publication Data
US 2017/0315207 A1 Nov. 2, 2017

(30) Foreign Application Priority Data
Sep. 24, 2014 (JP) .................. 2014-193889

(51) Int. Cl.
*G01S 3/86* (2006.01)
*G01S 13/93* (2006.01)
(Continued)

(52) U.S. Cl.
CPC .................. *G01S 3/86* (2013.01); *G01S 7/40* (2013.01); *G01S 13/93* (2013.01); *G01S 17/023* (2013.01);
(Continued)

(58) Field of Classification Search
CPC ... G01S 3/86; G01S 7/40; G01S 13/93; G01S 17/023; G01S 2013/9346; G01S 2013/9353; G08G 1/16; B60W 30/08
(Continued)

(56) References Cited

U.S. PATENT DOCUMENTS

2006/0002587 A1* 1/2006 Takahama ................ B60R 1/00
382/103
2013/0124041 A1* 5/2013 Belser ................ B60W 30/095
701/41
(Continued)

FOREIGN PATENT DOCUMENTS

| JP | 2011-068216 | | 4/2011 |
| JP | 2011-220732 | A | 11/2011 |
| JP | 2014-122873 | A | 7/2014 |

*Primary Examiner* — Daryl Pope
(74) *Attorney, Agent, or Firm* — Knobbe, Martens, Olson & Bear, LLP

(57) ABSTRACT

In an object detection apparatus, a first region definition unit defines a first object region including a first detection point representing a relative position of a first object detected by a millimeter-wave radar with respect to a reference point in an XY-plane. An X-axis direction of the XY-plane is a vehicle widthwise direction, and a Y-axis direction of the XY-plane is a vehicle lengthwise direction. A second region definition unit defines a second object region including a second detection point representing a relative position of a second object detected based on a captured image with respect to the reference point. A region size modification unit modifies the size of the first region in the presence of axial misalignment of the radar. A determination unit determines that the first and second objects are the same if there is an overlap of the first and second object regions in the XY-plane.

5 Claims, 7 Drawing Sheets

(51) Int. Cl.
    *G01S 17/02*     (2006.01)
    *G01S 7/40*     (2006.01)
    *G08G 1/16*     (2006.01)
    *B60W 30/08*     (2012.01)

(52) U.S. Cl.
    CPC ............... *G08G 1/16* (2013.01); *B60W 30/08* (2013.01); *G01S 2013/9346* (2013.01); *G01S 2013/9353* (2013.01)

(58) Field of Classification Search
    USPC ............................. 340/435, 436, 425.5, 937
    See application file for complete search history.

(56) References Cited

U.S. PATENT DOCUMENTS

| | | | |
|---|---|---|---|
| 2014/0062759 A1* | 3/2014 | Morikawa ............... | G01S 17/42 342/59 |
| 2014/0139369 A1 | 5/2014 | Baba | |

\* cited by examiner

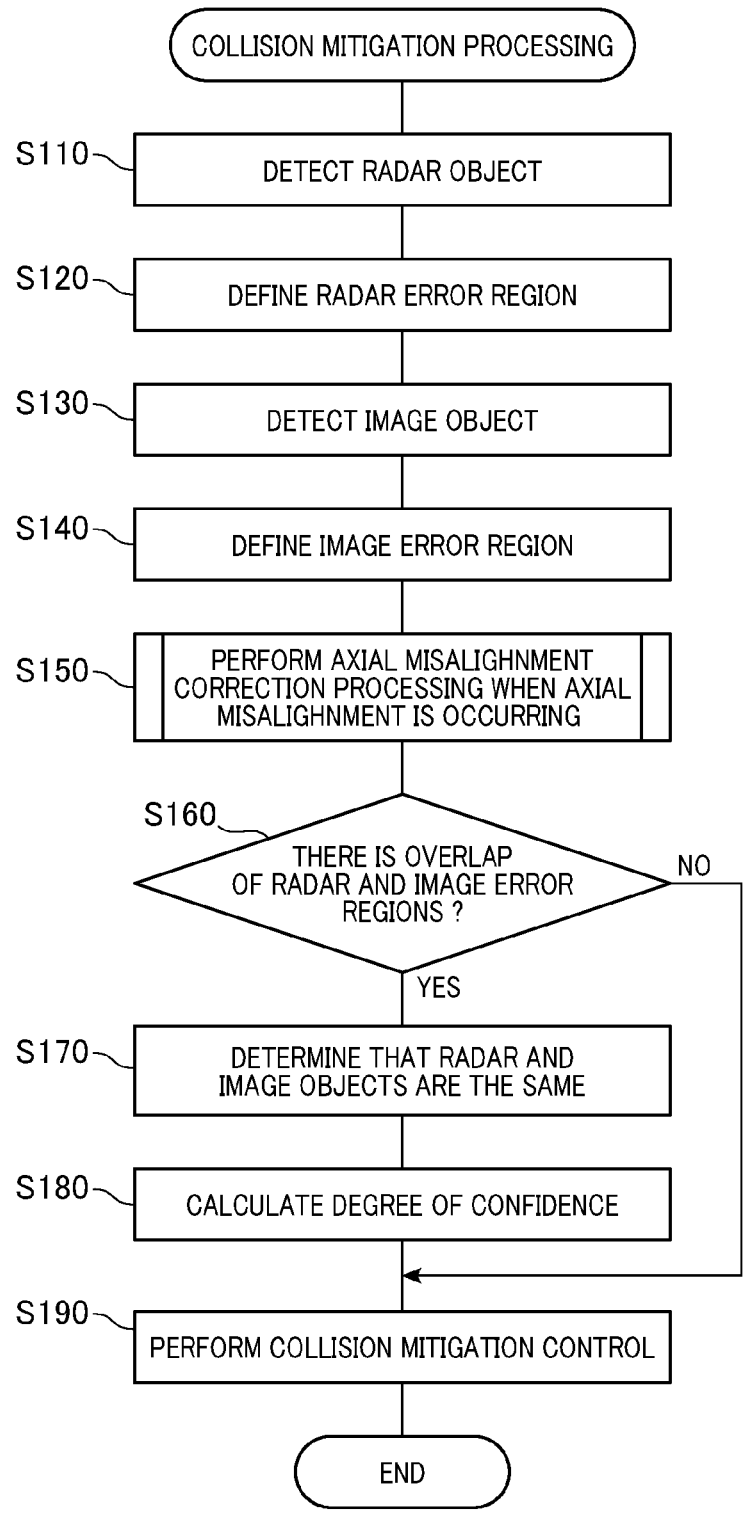

IN THE CASE OF NEGATIVE RELATIVE SPEED OF MILLIMETER-WAVE RADAR OBJECT

IN THE CASE OF POSITIVE RELATIVE SPEED OF MILLIMETER-WAVE RADAR OBJECT

— NORMAL
— — WHEN AXIAL MISALIGNMENT IS OCCURRING

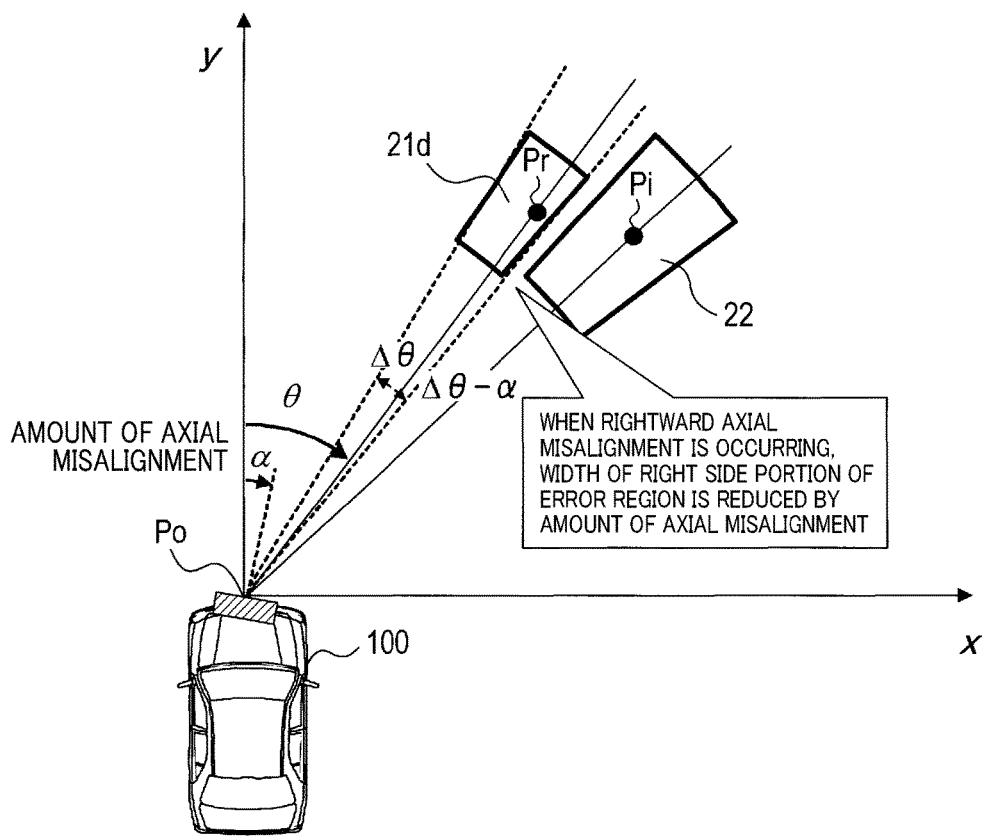

OBJECT DETECTION APPARATUS

CROSS-REFERENCE TO RELATED APPLICATIONS

This application is based on and claims the benefit of priority from earlier Japanese Patent Application No. 2014-193889 filed Sep. 24, 2014, the description of which is incorporated herein by reference.

TECHNICAL FIELD

The present invention relates to techniques for detecting objects using a radar and a camera.

BACKGROUND ART

Vehicle collision avoidance systems are required to accurately detect objects, such as a vehicle other than an own vehicle that is a vehicle carrying the system and a pedestrian. For example, a vehicle collision avoidance system as disclosed in Patent Literature 1 is configured to detect objects using a radar and a camera. More specifically, the disclosed vehicle collision avoidance system uses a millimeter-wave radar and a stereoscopic camera separately, and if a positional relationship between an object detected by the millimeter-wave radar and an object detected by the stereoscopic camera meets a predetermined criteria, determines that these objects are the same.

CITATION LIST

Patent Literature

[Patent Literature 1] JP-A-2014-122873

SUMMARY OF THE INVENTION

Technical Problem

In the above vehicle collision avoidance system, however, a sensor mounting angle may deviate from a predetermined mounting angle, which may cause vertical or horizontal axial misalignment of the sensor. Insufficient axial misalignment correction may result in reduced object identification accuracy.

In consideration of the foregoing, exemplary embodiments of the present invention are directed to providing an object detection apparatus capable of accurately determining whether or not objects detected using a radar and a camera are the same even in the presence of axial misalignment.

Solution to Problem

In accordance with an exemplary embodiment of the present invention, there is provided an object detection apparatus mounted in a vehicle, including: a first region definition unit configured to define a first object region including a first detection point, the first detection point representing a relative position of a first object detected based on information acquired by a radar with respect to a reference point in an XY-plane, the reference point representing a position of the vehicle, an X-axis direction of the XY-plane being a vehicle widthwise direction, and a Y-axis direction of the XY-plane being a vehicle lengthwise direction; and a second region definition unit configured to define a second object region including a second detection point, the second detection point representing a relative position of a second object detected based on an image captured by a monocular camera with respect to the reference point in the XY-plane.

The apparatus further includes: an axial misalignment detection unit configured to detect the presence or absence of axial misalignment that represents a deviation of a direction of an axis of the radar from a reference direction; a region size modification unit configured to, in the presence of the axial misalignment, modify the size of the first region; and a determination unit configured to determine whether or not there is an overlap of the first and second object regions in the XY-plane, and if it is determined that there is an overlap of the first and second object regions in the XY-plane, then determine that the first and second objects are the same.

With the object detection apparatus configured as above, in the presence of axial misalignment, the determination as to whether or not there is an overlap of the first and second object regions in the XY-plane can be modified by modifying the size of the first region. This configuration enables a more accurate determination as to whether or not the first and second objects are the same.

The above and other objects, features and advantages of the present invention will be readily apparent and fully understood from the following detailed description of preferred embodiments, taken in connection with the appended drawings.

BRIEF DESCRIPTION OF DRAWINGS

FIG. 2 is a flowchart of collision mitigation processing to be performed in the collision mitigation ECU;

FIG. 9 is a plan view of error regions when a rightward axial misalignment is occurring.

DESCRIPTION OF THE EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Configuration)

An collision mitigation apparatus 1 in accordance with one embodiment of the present invention is an apparatus mounted in a vehicle (hereinafter referred to as an own vehicle), such as a passenger car, and configured to detect an object (that is an object, such as a vehicle other than the own vehicle or a pedestrian) using a radar and a camera image, and in cases where the own vehicle is likely to collide with the object, perform control operations, such as braking the own vehicle, to avoid the collision or mitigate the impact of any possible collision between the object and the own vehicle. Particularly, the collision mitigation apparatus 1 of the present embodiment is configured to, in the presence of axial misalignment of the radar where a mounting angle of the millimeter-wave radar 2, which corresponds to a direction of the center axis of the radar, horizontally or vertically deviates from a predetermined mounting angle which corresponds to a forward direction of a straight line passing through both the center of the front and the center of the rear of the own vehicle and being parallel to a road surface, prevent different objects from being misrecognized as the same object.

Figure 1A:
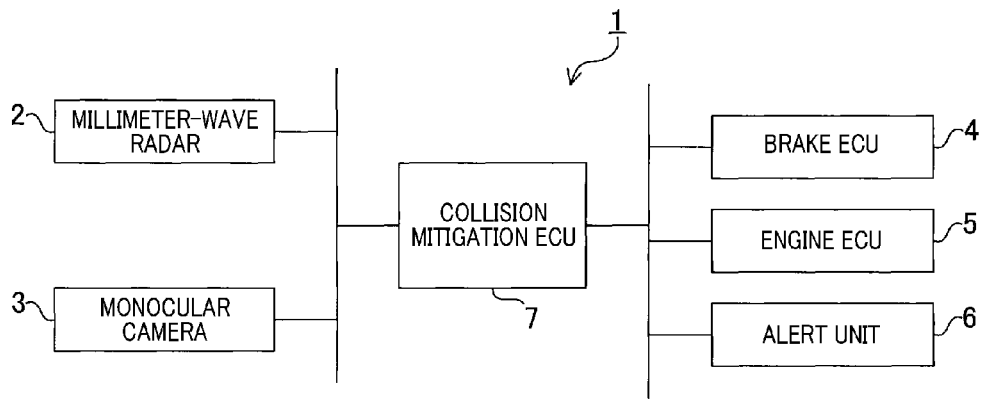
FIG. 1A is a block diagram of a collision mitigation apparatus in accordance with one embodiment of the present invention.

The collision mitigation apparatus 1, as shown in FIG. 1A, includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6. Configurations to implement the communications are not particularly limited.

The millimeter-wave radar 2 is mounted in the center (leading edge) of a front grille of the own vehicle to detect objects, such as other vehicles and pedestrians, by using millimeter waves. The millimeter-wave radar 2 transmits millimeter waves forward from the own vehicle while scanning in a horizontal plane and receives millimeter waves reflected back to thereby transmit transmitted and received data in the form of radar signals to the collision mitigation ECU 7.

The monocular camera 3 includes one charge-coupled device (CCD) camera, and is arranged on the inside of a windshield of the own vehicle between an interior mirror of the own vehicle and the windshield. The monocular camera 3 transmits data of captured images in the form of image signals to the collision mitigation ECU 7. The monocular camera 3 is provided with a function to correct for an own axial misalignment. The forward direction of the own vehicle substantially coincides with an axis direction of the monocular camera 3. Therefore, an axial misalignment of the millimeter-wave radar 2 can be detected with respect to the axis direction of the monocular camera 3 (i.e., a position of an object acquired from the image).

The brake ECU 4 includes CPU, ROM, RAM, and others to control braking of the own vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the own vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the own vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock.

(Processing)

There will now be described object detection processing to be performed in the collision mitigation apparatus 1. An object detection program, i.e., a program for the collision mitigation apparatus 1 to implement the object detection processing, is stored in the ROM or the like of the collision mitigation apparatus 1. The object detection processing to be performed in the collision mitigation apparatus 1 will be described with reference to FIG. 2. FIG. 2 illustrates a flowchart of the object detection processing to be performed in the collision mitigation apparatus 1 every predetermined time interval.

First, in the collision mitigation processing, as shown in FIG. 2, the collision mitigation ECU 7 detects an object based on a radar signal transmitted from the millimeter-wave radar 2 (i.e., detection information from the millimeter-wave radar 2) (step S110). More specifically, based on the radar signal, the collision mitigation ECU 7 calculates (or determines) a linear distance from the own vehicle to the object and a horizontal azimuth angle of the object (i.e., an angular position of the object from the forward direction of the own vehicle).

Figure 3:
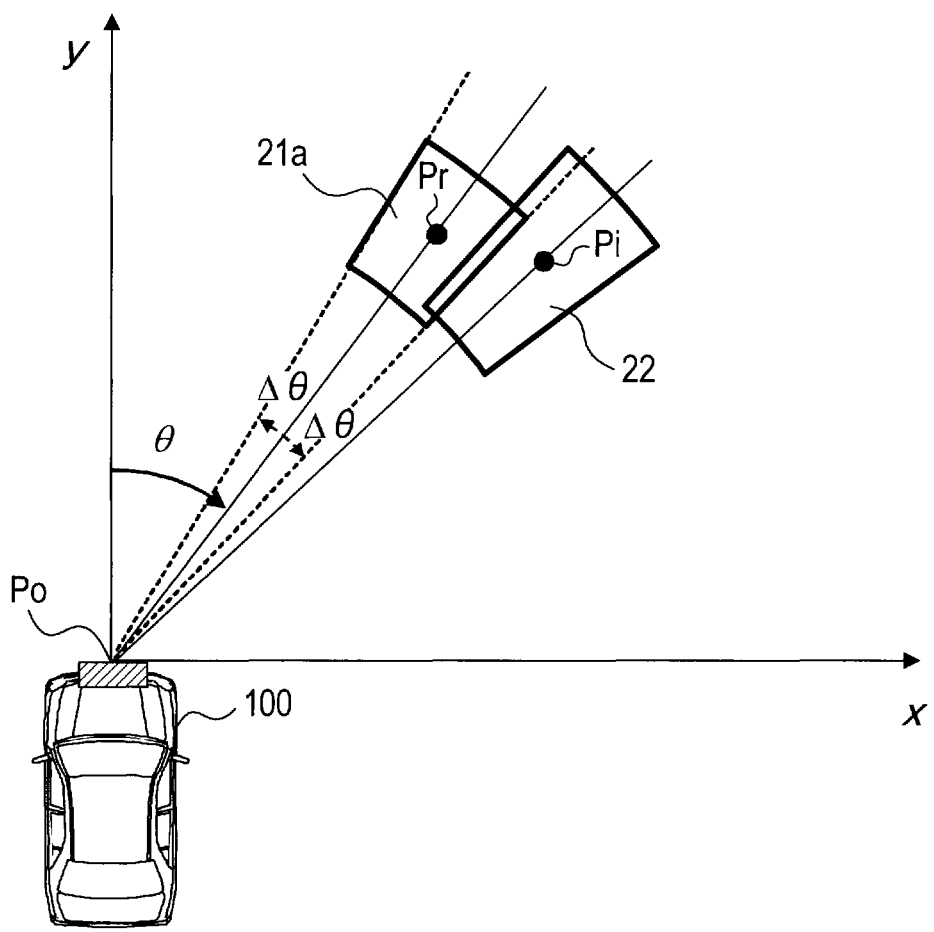
FIG. 3 is a plan view of error regions when no axial misalignment is occurring.

Based on these calculated values, the collision mitigation ECU 7, as shown in FIG. 3, calculates or determines position coordinates (X- and Y-coordinates) of the object in the XY-plane as a detection point Pr of the object in the XY-plane. The X-axis of the XY-plane represents a vehicle-widthwise direction (transverse direction) of the own vehicle, and the Y-axis of the XY-plane represents a vehicle-lengthwise direction (forward direction) of the own vehicle.

A reference point Po of the XY-plane is set at a nose (or front end) of the own vehicle, on which the millimeter-wave radar 2 is mounted. The detection point Pr is a relative position of the object with respect to the reference point Po. FIG. 3 illustrates an example of an object located forward of and to the right of the own vehicle. Additionally, in step S110, the collision mitigation ECU 7 may calculate, in addition to the detection point Pr of the object, a relative speed and the like of the object with respect to the own vehicle. In the following, the object detected in step S110 (information about the object detected based on the detection information from the millimeter-wave radar 2) will be referred to as a "radar object."

Subsequently, as shown in FIG. 3, the collision mitigation ECU 7 defines an error region 21a centered at the detection point Pr calculated in step S110 (step S120). More specifically, the error region 21a has a two-dimensional extension (specified by AO) centered at the detection point Pr, where an extension of the error region 21a in the X-axis direction represents a range of assumed error around the X-coordinate of the detection point Pr and an extension of the error region 21a in the Y-axis direction represents a range of assumed error around the Y-coordinate of the detection point Pr.

These ranges of assumed error are predetermined based on the characteristics of the millimeter-wave radar 2.

Subsequently, the collision mitigation ECU 7 detects an object based on an image signal transmitted from the monocular camera 3 (i.e., a captured image from the monocular camera 3) (step S130). More specifically, the collision mitigation ECU 7 applies image analysis to the captured image represented by the image signal to identify an object. This identification may be implemented by matching processing with prestored object models.

An object model is prepared for each object type, such as a vehicle, a pedestrian, or the like, which allows not only determination of the presence of an object, but also identification of its object type. The collision mitigation ECU 7 determines a Y-coordinate of the object in the XY-plane based on a vertical position of the object in the captured image, and a horizontal azimuth angle of the object (an angular position from the forward direction of the own vehicle) based on a horizontal position of the object in the capture image.

As the object is located more distant from the own vehicle in the forward direction of the own vehicle, that is, as the Y-coordinate of the object is increased, a lower end of the object tends to be located at a higher position in the captured image. This allows the Y-coordinate of the object to be determined based on the lower end position of the object in the captured image. In such a specific manner, however, inaccurate detection of the lower end position of the object will leads to lower accuracy of detecting the Y-coordinate of the object.

In addition, a horizontal displacement of the object from the focus of expansion (FOE) of the monocular camera 3 tends to increase with an increasing angular displacement (inclination) of the object from the forward direction of the own vehicle (specifically, a line of X=0). This allows a horizontal azimuth angle of the object to be determined based on an angle of a line passing through the reference point Po and the object with respect to the line of X=0 and a distance to a vertical line passing through the center of the object.

As such, in step S130, the collision mitigation ECU 7 determines the Y-coordinate and the horizontal azimuth angle (angular position) of the object in the XY-plane as the detection point Pi of the object in the XY-plane, as shown in FIG. 3. The detection point Pi of the object represents a relative position of the object with respect to the reference point Po. In the following, the object detected in step S130 (the object detected based on the captured image from the monocular camera 3) will be referred to as an "image object."

Subsequently, as shown in FIG. 3, the collision mitigation ECU 7 defines an error region 22 centered at the detection point Pi calculated in step S130 (step S140). More specifically, the error region 22 has a two-dimensional extension centered at the detection point Pi, where an extension of the error region 22 in the Y-axis direction represents a range of assumed error around the Y-coordinate of the detection point Pi and an extension of the error region 22 in the horizontal azimuth angle direction represents a range of assumed error around the horizontal azimuth angle of the detection point Pi. These ranges of assumed error are predetermined based on the characteristics of the monocular camera 3.

Subsequently, the collision mitigation ECU 7 performs axial misalignment correction processing (step S150). In the presence of axial misalignment, the axial misalignment correction processing is performed to correct the size of the error region 21a.

Figure 4:
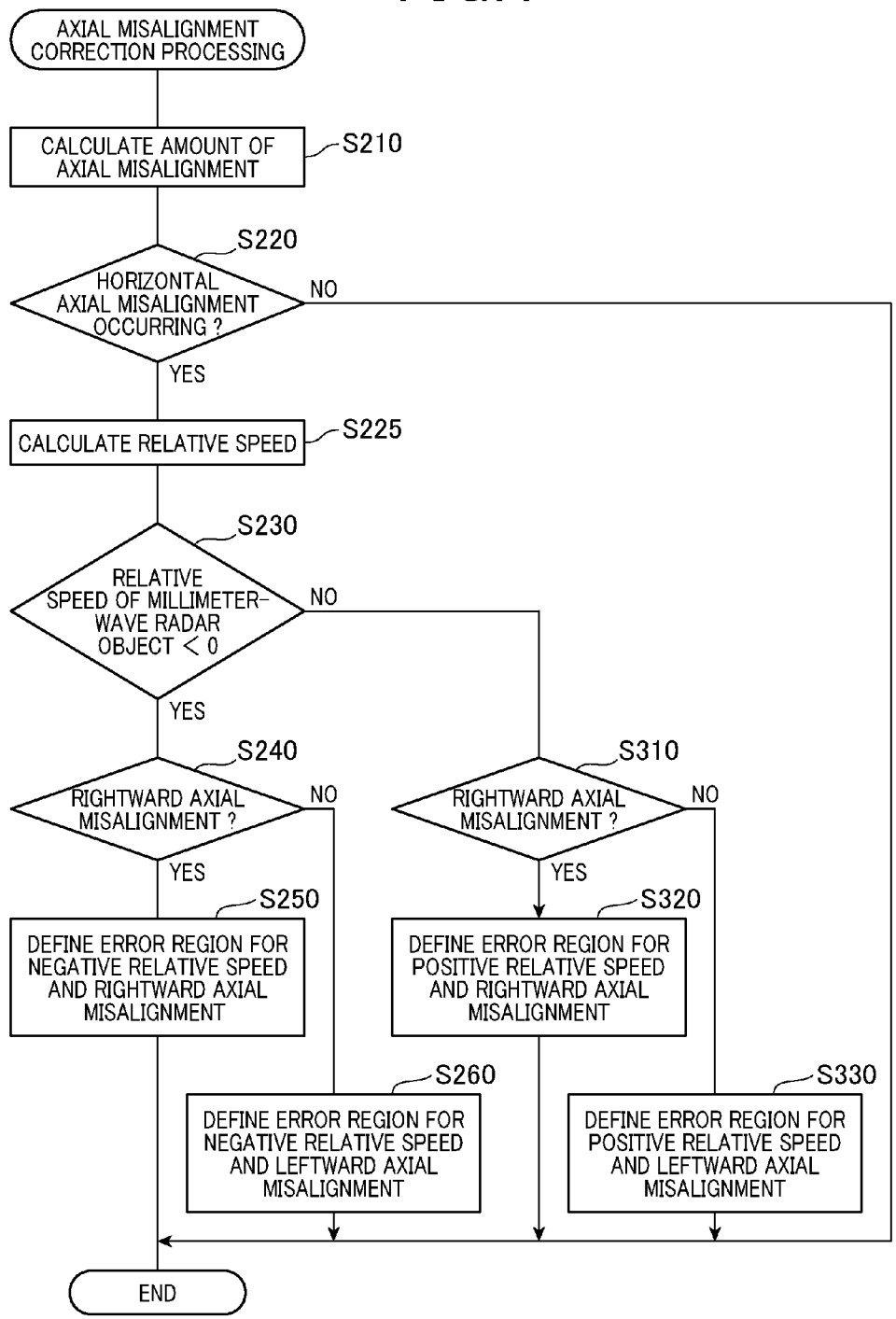
FIG. 4 is a flowchart of axial misalignment correction processing included in the collision mitigation processing.

In the misalignment correction processing, as shown in FIG. 4, the collision mitigation ECU 7 calculates an amount of axial misalignment (step S210), where a positional relationship between the radar and the captured image (i.e., an error between a radar coordinate system and a captured-image coordinate system) is estimated. For example, a location of a roadside object, such as guardrail, and its direction of movement are detected by the millimeter-wave radar 2 to determine a tilt of the roadside object arrangement with respect to the forward direction of the own vehicle and a difference in direction of the movement, based on which what degree of axial misalignment is occurring can be recognized.

Subsequently, the collision mitigation ECU 7 determines whether or not a horizontal axial misalignment is occurring (step S220). If an amount of axial misalignment is equal to or greater than a threshold (say one degree or so), it is determined that a horizontal axial misalignment is occurring.

If it is determined that no horizontal axial misalignment is occurring (step S220; NO), the process flow ends. If it is determined that a horizontal axial misalignment is occurring (step S220; YES), a relative speed of the object with respect to the own vehicle is calculated (step S225).

In step S225, the relative speed of the object with respect to the own vehicle is calculated based on a detection result acquired from the millimeter-wave radar 2. In the present embodiment, the relative speed as the object moves away from the own vehicle is defined as "positive", and the relative speed as the object approaches the own vehicle is defined as "negative".

Subsequently, the collision mitigation ECU 7 determines whether or not the relative speed of the object is negative (step S230). If the relative speed of the object is negative (step S230; YES), the collision mitigation ECU 7 makes a judgment on a direction of the axial misalignment (step S240). If the axial misalignment is a rightward axial misalignment (step S240; YES), the collision mitigation ECU 7 defines an error region for the negative relative speed and the rightward axial misalignment (step S250).

Figure 5:
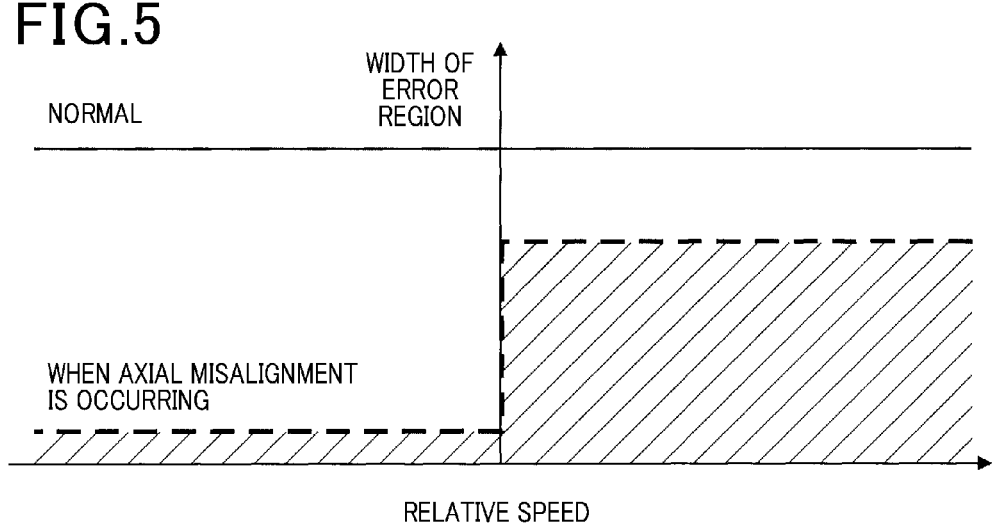
FIG. 5 is a graph of width of an error region versus relative speed.

As shown in FIG. 5, when axial misalignment is occurring, the error region 21a for the detection point of the millimeter-wave radar 2 is narrowed as compared to when no axial misalignment is occurring (i.e., a normal situation). That is, AO as shown in FIG. 3 is set to a smaller value.

Figure 6:
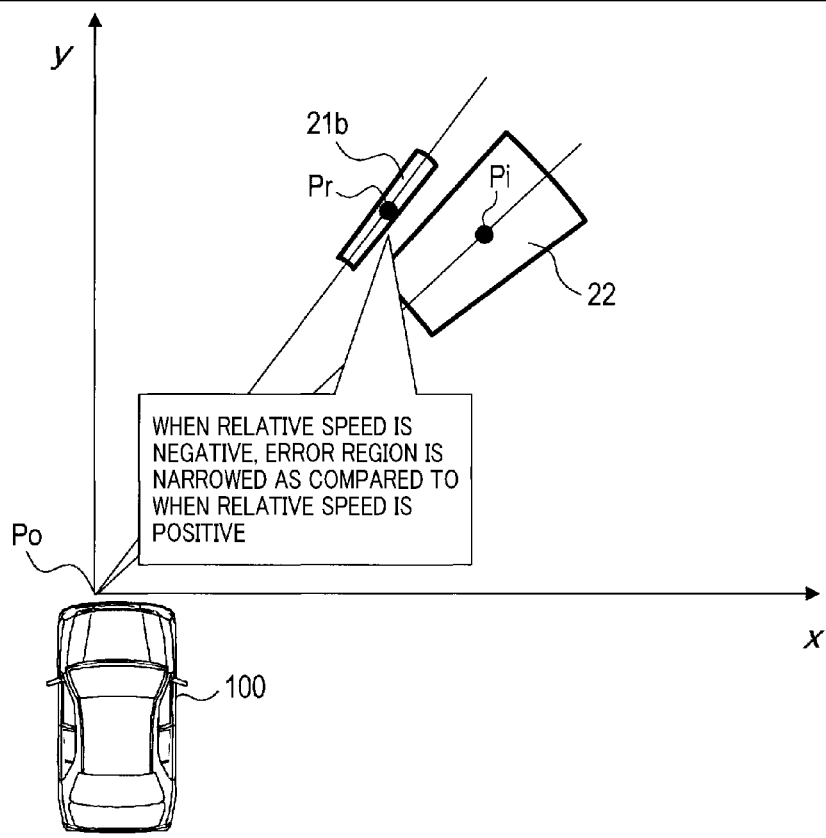
FIG. 6 is a plan view of error regions for a negative relative speed when axial misalignment is occurring.
Figure 7:
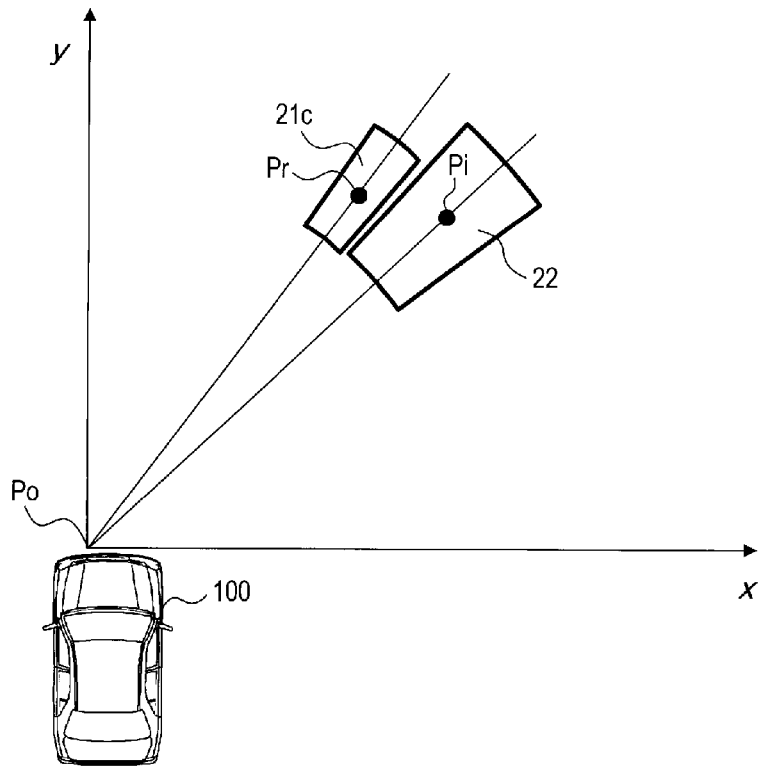
FIG. 7 is a plan view of error regions for a positive relative speed when axial misalignment is occurring.

In the presence of axial misalignment, as shown in FIG. 5, the width of the error region 21a for a negative relative speed is set to a smaller value than that of the error region 21a for a positive relative speed. It can be seen that the width of the error region 21b for a negative relative speed as shown in FIG. 6 is set less than that of the error region 21c for a positive relative speed as shown in FIG. 7.

In addition, in the presence of axial misalignment, the width of the error region 21a for the detection point of the millimeter-wave radar 2 is corrected depending not only on the relative speed, but also on the direction and amount of the axial misalignment. That is, as shown in FIG. 8, the width of the error region 21a is decreased with increasing amount of the axial misalignment (or with increasing distance from the origin as shown in FIG. 8).

Figure 8:
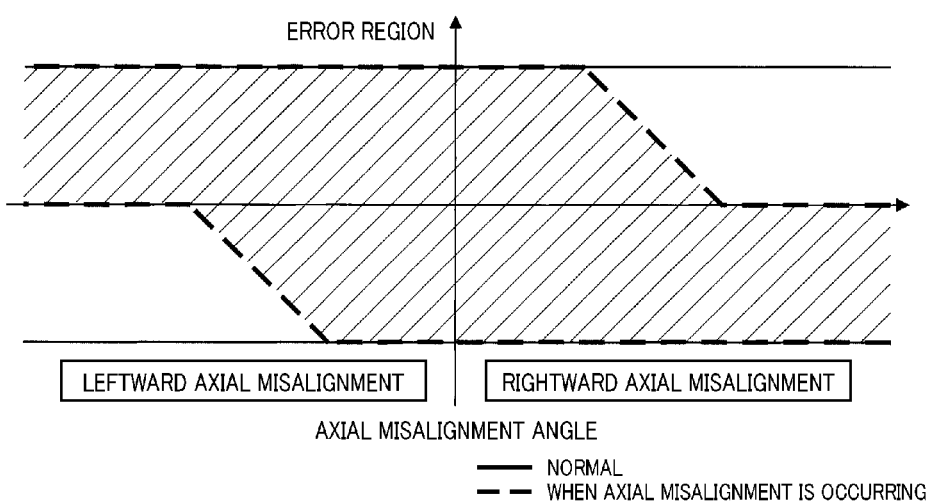
FIG. 8 is a graph of extent of an error region versus axial misalignment angle.

In FIG. 8, the axial misalignment angle and the error region are defined as "positive" in the vehicle-widthwise (laterally) right direction. That is, the error region 21a is corrected or modified such that the right side portion of the error region 21a is narrowed with increasing amount of the rightward axial misalignment while the left side portion of the error region 21a is not narrowed even with increasing amount of the rightward axial misalignment. Conversely, the error region 21a is corrected or modified such that the left side portion of the error region 21a is narrowed with increasing amount of the leftward axial misalignment while the right side portion of the error region 21a is not narrowed even with increasing amount of the leftward axial misalignment.

More specifically, for example, as shown in FIG. 9, given an amount of the rightward axial misalignment denoted by α, the width of the right side portion of the corrected error region 22d is corrected to Δθ−α while the width of the left side portion of the corrected error region 22d is kept at Δθ.

As such, in step S250, a correction amount, which is determined by combining a map for correcting the width of the error region 21a depending on the relative speed, as shown in FIG. 5, and a map for correcting the width of the error region 21a depending on the amount of the axial misalignment, is applied to the error region 21a to acquire a corrected error region 21a. Also in steps S260, S320, S330 described later, the error region is defined using similar maps to those used in step S250.

More specifically, in step S240, if the axial misalignment is a leftward axial misalignment (step S240; NO), then the collision mitigation ECU 7 defines an error region for the negative relative speed and the leftward axial misalignment (step S260). If the relative speed of the object is zero or positive (step S230; NO), then the collision mitigation ECU 7 makes a judgment on the direction of the axial misalignment (step S310).

If the axial misalignment is a rightward axial misalignment (step S310; YES), then the collision mitigation ECU 7 defines an error region for the positive relative speed and the rightward axial misalignment (step S320). If the axial misalignment is a leftward axial misalignment (step S310; NO), then the collision mitigation ECU 7 defines an error region for the positive relative speed and the leftward axial misalignment (step S330).

Thereafter, the process flow ends. Subsequently, returning to FIG. 2, the collision mitigation ECU 7 determines whether or not there is an overlap of the radar error region 21a and the error region 22 in the XY-plane (step S160).

If in step S160 it is determined that there is an overlap of the radar error region 21a and the error region 22, then the collision mitigation ECU 7 determines that the radar object and the image object are the same (step S170). In this case, a position of the object determined the same in the XY-plane is specified by the Y-coordinate of the detection point Pr of the radar object and the horizontal azimuth angle of the image object.

Subsequently, the collision mitigation ECU 7 calculates a degree of confidence in determination that the radar object and the image object are the same (step S180). In the present embodiment, the degree of confidence is defined by an angle difference between the horizontal azimuth angle of the detection point Pr of the radar object and the horizontal azimuth angle of the detection point Pi of the image object. Such a degree of confidence increases with decreasing angle difference.

If it is determined in step S160 that there exists no overlap of the radar error region 21a and the error region 22, then the collision mitigation ECU 7 determines that the radar object and the image object are not the same, that is, they are different objects. Then, the process flow proceeds to step S190.

Subsequently, the collision mitigation ECU 7 performs collision mitigation control based on the position of the detected object and the degree of confidence (step S190).

For example, if the own vehicle is likely to collide with the object, the collision mitigation ECU 7 transmits a warning signal to an alert unit 6 to alert the driver. If the own vehicle is more likely to collide with the object, the collision mitigation ECU 7 instructs the engine ECU 5 to decrease a driving force of an internal-combustion engine and/or instructs the brake ECU 4 to increase a braking force of the own vehicle.

In addition, the collision mitigation ECU 7 changes control aspects depending on the degree of confidence. For example, for a high degree of confidence, a control initiation timing is advanced as compared to a control initiation timing for a low degree of confidence.

Figure 1B:
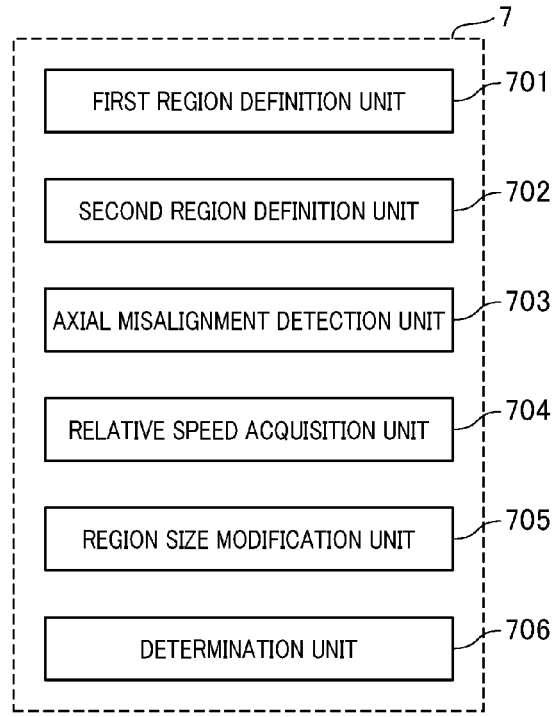
FIG. 1B is a functional block diagram of a collision mitigation ECU.

In the present embodiment, the collision mitigation ECU 7 corresponds to an object detection apparatus of the present invention. FIG. 1B illustrates a functional block diagram of the collision mitigation ECU 7. Various implementations of these blocks described herein can be realized in processor, in software, or in any combination thereof. The collision mitigation ECU 7 includes, as functional blocks, a first region definition unit 701, a second region definition unit 702, an axial misalignment detection unit 703, and a relative speed acquisition unit 704, a region size modification unit 705, and a determination unit 706. The first region definition unit 701 performs steps S110-S120. The second region definition unit 702 performs step S130-S140. The axial misalignment detection unit 703 performs step S210. The relative speed acquisition unit 704 performs step S225. The region size modification unit 705 performs steps S230-S330. The determination unit 706 performs steps S160-S170.

In the collision mitigation apparatus 1 configured as above, the collision mitigation ECU 7 determines whether or not axial misalignment is occurring, where the axial misalignment represents a deviation of the reference direction of the millimeter-wave radar 2 from the reference direction of the axis of the monocular camera 3. In the presence of axial misalignment, the collision mitigation ECU 7 modifies the size of the first region. If it is determined that there is an overlap of the first and second regions in the XY-plane, then the collision mitigation ECU 7 determines that the first object and the second object are the same.

With the collision mitigation apparatus 1 configured as above, in the presence of axial misalignment, the size of the first region is modified, which can modify the determination as to whether or not there is an overlap of the first and second regions. This allows for more accurate determination as to whether or not the first and second objects are the same.

In addition, with the collision mitigation apparatus 1 configured as above, in the presence of axial misalignment, the collision mitigation ECU 7 narrows the first region. That is, since, in the presence of axial misalignment, non-identical objects are more likely to be mistakenly recognized as the same, narrowing the first region can prevent non-identical objects from being mistakenly recognized as the same.

Therefore, with the collision mitigation apparatus 1 configured as above, the determination as to whether or not the first and second objects are the same can be made more accurately.

In the collision mitigation apparatus 1, the collision mitigation ECU 7, in the presence of axial misalignment, acquires information about the determination as to whether the reference direction of the monocular camera 3 is rightward or leftward misaligned with the reference direction of the millimeter-wave radar 2, and narrows one of the right side and left side portions of the first region that is situated in the direction that the axial misalignment is occurring.

Since, in the presence of axial misalignment, different objects present in the direction that the axial misalignment is occurring are more likely to be mistakenly determined as the same, one of the right side and left side portions of the first region that is situated in the direction that the axial misalignment is occurring is narrowed. With the collision mitigation apparatus 1 having such a configuration, the determination as to whether or not different objects are the same can be made more accurately.

In the collision mitigation apparatus 1, the collision mitigation ECU 7 acquires, as a relative speed, a speed difference between the first or second object and the own vehicle, and when the relative speed is negative, narrows the first region as compared to when the relative speed is negative.

With the collision mitigation apparatus 1 configured as above, when the relative speed is negative, that is, when the own vehicle is approaching the object, the first region is narrowed, which can prevent different objects from being mistakenly recognized as the same. This configuration can prevent a malfunction of the vehicle control caused by mistakenly recognizing different objects as the same.

In addition, in the collision mitigation apparatus 1, the collision mitigation ECU 7 defines a certain range of angles centered at an azimuth angle of the first object with respect to the reference point as the width of the first region, and modifies the size of the first region by modifying only the width of the first region.

With the collision mitigation apparatus 1 configured as above, only the width of the first region is modified, where the determination as to whether or not different objects are the same is susceptible to the axial misalignment. Therefore, the determination as to whether or not different objects are the same can be kept unchanged in the going away (or radial) direction without being affected by the axial misalignment.

Other Embodiments

The present invention is not in any way limited to the above embodiment. Reference numerals and signs used in the above description of the embodiment are appropriately used in the claims as well. The reference numerals and signs are used for easy understanding of the present invention, and should not be construed as limiting the technical scope of the present invention. The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the collision mitigation apparatus 1 disclosed above and that the present invention can be implemented in numerous ways, including as a system that includes the collision mitigation apparatus 1 as a component, a program for enabling a computer to function as the collision mitigation apparatus 1, a storage medium storing such a program, a collision mitigation method and the like.

In the above embodiment, the map for correcting the width of the error region 21a depending on the relative speed and the map for correcting the width of the error region 21a depending on the amount and direction of the axial misalignment are applied in combination. Alternatively, either one of these maps may be applied to acquire the corrected error region 21a.

The invention claimed is:

1. An object detection apparatus mounted in a vehicle, comprising:
a first region definition unit configured to define a first object region including a first detection point, the first detection point representing a relative position of a first object detected based on information acquired by a radar with respect to a reference point in an XY-plane, the reference point representing a position of the vehicle, an X-axis direction of the XY-plane being a vehicle widthwise direction, and a Y-axis direction of the XY-plane being a vehicle lengthwise direction;
a second region definition unit configured to define a second object region including a second detection point, the second detection point representing a relative position of a second object detected based on an image captured by a monocular camera with respect to the reference point in the XY-plane;
an axial misalignment detection unit configured to detect the presence or absence of axial misalignment that represents a deviation of a direction of an axis of the radar from a reference direction;
a region size modification unit configured to, in the presence of the axial misalignment, modify the size of the first region; and
a determination unit configured to determine whether or not there is an overlap of the first and second object regions in the XY-plane, and if it is determined that there is an overlap of the first and second object regions in the XY-plane, then determine that the first and second objects are the same, wherein
the region size modification unit is configured to, in the presence of the axial misalignment, narrow the first region.

2. The apparatus according to claim 1, wherein
the axial misalignment detection unit is configured to, in the presence of the axial misalignment, acquire information as to whether a reference direction of the monocular camera is rightward or leftward misaligned with a reference direction of the radar, and
the region size modification unit is configured to, in the presence of the axial misalignment, narrows one of right side and left side portions of the first region that is situated in the direction that the axial misalignment is occurring.

3. The apparatus according to claim 1, further comprising a relative speed acquisition unit configured to acquire, as a relative speed, a speed difference between the first or second object and the own vehicle, wherein
the region size modification unit is configured to, when the relative speed is negative, narrow the first region as compared to when the relative speed is positive.

4. The apparatus according to claim 1, wherein
the first region definition unit is configured to define a range of angles including an azimuth angle of the first object with respect to the reference point as a width of the first region, and the region size modification unit is configured to modify the size of the first region by modifying only the width of the first object region.

5. An object detection apparatus mounted in a vehicle, comprising:
- a first region definition unit configured to define a first object region including a first detection point, the first detection point representing a relative position of a first object detected based on information acquired by a radar with respect to a reference point in an XY-plane, the reference point representing a position of the vehicle, an X-axis direction of the XY-plane being a vehicle widthwise direction, and a Y-axis direction of the XY-plane being a vehicle lengthwise direction;
- a second region definition unit configured to define a second object region including a second detection point, the second detection point representing a relative position of a second object detected based on an image captured by a monocular camera with respect to the reference point in the XY-plane;
- an axial misalignment detection unit configured to detect the presence or absence of axial misalignment that represents a deviation of a direction of an axis of the radar from a reference direction;
- a region size modification unit configured to, in the presence of the axial misalignment, modify the size of the first region;
- a determination unit configured to determine whether or not there is an overlap of the first and second object regions in the XY-plane, and if it is determined that there is an overlap of the first and second object regions in the XY-plane, then determine that the first and second objects are the same; and
- a relative speed acquisition unit configured to acquire, as a relative speed, a speed difference between the first or second object and the own vehicle, wherein
- the region size modification unit is configured to, when the relative speed is negative, narrow the first region as compared to when the relative speed is positive.

* * * * *